United States Patent
Yang

(12) 
(10) Patent No.: US 6,813,170 B2
(45) Date of Patent: Nov. 2, 2004

(54) MULTIPLE OUTPUT POWER SUPPLY HAVING SOFT START PROTECTION FOR LOAD OVER-CURRENT OR SHORT CIRCUIT CONDITIONS

(75) Inventor: Jian Yang, Thousand Oaks, CA (US)

(73) Assignee: Semtech Corporation, Camarillo, CA (US)

(*) Notice: Subject to any disclaimer, the term of this patent is extended or adjusted under 35 U.S.C. 154(b) by 45 days.

(21) Appl. No.: 10/224,269

(22) Filed: Aug. 19, 2002

(65) Prior Publication Data

US 2004/0032754 A1 Feb. 19, 2004

(51) Int. Cl.[7] .............................................. H02H 7/122
(52) U.S. Cl. ...................... 363/56.09; 363/49; 323/901
(58) Field of Search ........................ 363/49, 50, 56.09, 363/56.1; 323/901, 908; 361/93.1, 93.2, 93.9, 87

(56) References Cited

U.S. PATENT DOCUMENTS

| | | | |
|---|---|---|---|
| 5,818,675 A | * | 10/1998 | Lu .............................. 361/93.9 |
| 6,301,135 B1 | | 10/2001 | Mammano et al. |
| 6,320,439 B1 | | 11/2001 | Garbelli et al. |
| 6,348,833 B1 | | 2/2002 | Tsujimoto et al. |
| 6,377,480 B1 | | 4/2002 | Sase et al. |
| 6,400,203 B1 | | 6/2002 | Bezzi et al. |
| 6,411,483 B1 | | 6/2002 | Sarles et al. |

* cited by examiner

*Primary Examiner*—Jessica Han
(74) *Attorney, Agent, or Firm*—O'Melveny & Myers LLP

(57) ABSTRACT

A protection circuit for a multiple output switching mode power converter protects against an over-current or short circuit failure condition. The protection circuit activates the soft-start circuit of the PWM control circuit upon detection of the over-current or short circuit condition. The soft-start circuit then shuts off operation of the power converter and restarts the power converter after a period of time defined by the soft-start circuit. The protection circuit is effective with any type of power converter topology (e.g., buck, boost, flyback, and forward converter), isolated or non-isolated, having dual or multiple outputs.

20 Claims, 3 Drawing Sheets

MULTIPLE OUTPUT POWER SUPPLY HAVING SOFT START PROTECTION FOR LOAD OVER-CURRENT OR SHORT CIRCUIT CONDITIONS

BACKGROUND OF THE INVENTION

1. Field of the Invention

The present invention relates to voltage regulator circuits. More particularly, the invention relates to multiple output switching mode power supply load over-current or short circuit protection.

2. Description of Related Art

Switched mode DC-to-DC power converters are commonly used in the electronics industry to convert an available direct current (DC) level voltage to another DC level voltage. A switched mode power converter provides a regulated DC output voltage to a load by selectively storing energy in an inductor coupled to the load by switching the flow of current into the inductor. There are several different topologies of switched mode power converter in common use, such as buck, boost, flyback, and forward converters, to name a few.

By way of example, a flyback converter is one type of switched mode converter that uses a power switch, typically a MOSFET transistor, to control the flow of current in the inductor. In order to obtain isolation between the input and output voltages, the flyback regulator may include a transformer that provides a physical dielectric barrier through which energy must pass prior to reaching the output. The power switch selectively couples the primary side of the transformer to the input voltage. The transformer may include plural secondary windings providing multiple positive or negative voltage outputs through respective rectifiers. During the on-state of the power switch, the full input voltage is placed across the primary winding of the transformer providing an increasing linear current ramp through the primary winding. When the power switch is turned off, the voltage across the power switch flies back to a voltage equal to the sum of the input voltage plus the turns ratio of the transformer multiplied by the output voltage (plus a diode voltage drop). During the flyback period (i.e., the power switch off-state), the output rectifier conducts, thereby passing the stored energy within the transformer core to the load. The flyback period continues until either the transformer core is depleted of energy, after which the voltage across the power switch returns to the input voltage, or the power switch is once again turned on.

A pulse width modulation (PWM) control circuit is used to control the gating of the power switch. In addition to controlling the power switch, the control circuit will also provide a stable reference voltage against which the output voltage may be compared to regulate operation of the power converter. The control circuit may also include a voltage error amplifier that performs the comparison of the reference to output voltage, and provides an error signal that determines the duty cycle of the signal used to control the power switch. It is also known to include a soft-start circuit that starts the power converter in a smooth fashion. The soft-start circuit will prevent the power switch from being driven to an on-state for a period of time sufficient to permit the input voltage to stabilize at a desired level. After this period of time is complete, the soft-start circuit applies power to the load in a controlled manner in which the duty cycle of the power switch is increased gradually. Without such a soft-start circuit, the voltage error amplifier would cause the duty cycle of the power switch to go to a maximum pulse width initially, causing an oscillating condition in which the current first overshoots and then undershoots before settling at a desired level.

Power converters generally include circuitry that protects the load in the event of a failure that occurs on the output lines of the power converter. Two types of failures that can occur on the output lines are over-current or short circuit. An over-current condition is typically caused by a short circuit in the load that is in series with a low load resistance. A short circuit is an over-current condition without the current limiting provided by any series resistance. In either condition, the power converter can deliver an excessive amount of current to the load, which could cause the rectifiers of the power converter to overheat and fail. To address these problems, protection circuits are used to sense a failure condition and reduce the power delivered to the load. These protection circuits operate in a cycle-by-cycle manner in which the duty cycle of the power switch is incrementally reduced with each successive cycle. A drawback of this operation is that the power converter is not completely shut down, and current continues to be delivered to the load.

Accordingly, it would be desirable to provide an improved way to protect a load of a multiple output switching mode power converter against an over-current or short circuit failure condition.

SUMMARY OF THE INVENTION

The present invention overcomes these drawbacks of the prior art by providing a protection circuit for a multiple output switching mode power converter that protects against an over-current or short circuit failure condition. The protection circuit activates the soft-start circuit of the PWM control circuit upon detection of the over-current or short circuit condition. The soft-start circuit then shuts off operation of the power converter and restarts the power converter after a period of time defined by the soft-start circuit.

More particularly, an exemplary switching mode power converter includes a transformer having a primary winding and a plurality of secondary windings. The secondary windings provide respective plural outputs through respective rectifiers. A switch is connected in series with the primary winding. An input voltage source is coupled to the primary winding. A controller is adapted to control operation of the switch to control a flow of current through the primary winding. The controller includes a feedback circuit to determine a duty cycle of the switch in response to a detected output voltage of at least one of the plural outputs and a detected current through the primary winding. The controller further includes a soft-start circuit used to inhibit activation of the switch for a predetermined period of time.

In an embodiment of the invention, the switching mode power converter further includes an over-current protection circuit coupled to the plural outputs so as to detect a change in either one of the plural outputs. Upon detection of the change, the over-current protection circuit activates the soft-start circuit to shut off delivery of the flow of current through the primary winding for the predetermined period of time. The soft-start circuit further includes a capacitor coupled to an internal voltage source of the controller, such that the period of time is defined by a charge time of the capacitor. The over-current protection circuit discharges the capacitor upon detection of the change in the load voltage. The over-current protection circuit further comprises a switch coupled to the capacitor, the switch connecting the capacitor to ground upon detection of the change in the load voltage. The over-current protection circuit further comprises an opto-isolator providing electrical isolation between the plural outputs and the controller.

In another embodiment of the invention, a method for protecting a multiple output switching mode power converter from an over-current or short circuit condition comprises the steps of: (a) detecting a change in one of the plural output voltages; (b) activating the soft-start circuit upon detection of the change in voltage; and (c) after a predetermined period of time, resuming normal operation of the power converter. The method further comprises isolating the plural outputs from the controller. The method further comprises maintaining the soft-start circuit in an activated state for a second predetermined period of time, wherein the resuming step occurs after completion of the second predetermined period of time.

A more complete understanding of the multiple output switching mode power supply having soft-start protection for load over-current or short circuit conditions will be afforded to those skilled in the art, as well as a realization of additional advantages and objects thereof, by a consideration of the following detailed description of the preferred embodiment. Reference will be made to the appended sheets of drawings that will first be described briefly.

DETAILED DESCRIPTION OF THE PREFERRED EMBODIMENT

The present invention satisfies the need for a way to protect a load of a multiple output switching mode power converter against an over-current or short circuit failure condition. In the detailed description that follows, like element numerals are used to describe like elements illustrated in one or more of the above-described figures.

Figure 1:
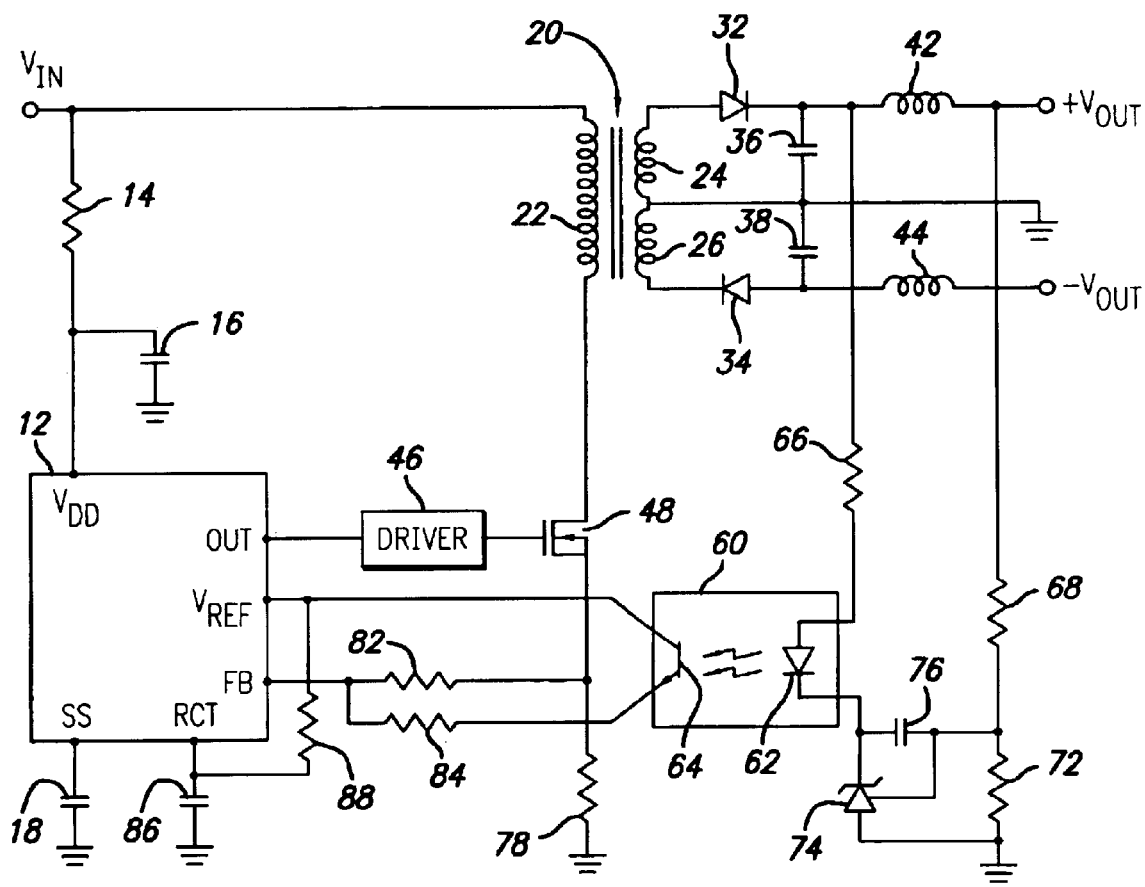
FIG. 1 is a schematic diagram of a prior art dual output switching mode DC-to-DC power converter.

Referring first to FIG. 1, a conventional dual output, switched mode DC-to-DC power converter is illustrated. The power converter receives an input voltage ($V_{IN}$) and provides an isolated positive output voltage ($+V_{OUT}$) and negative output voltage ($-V_{OUT}$) at respective terminals coupled to a load (not shown). While the exemplary power converter provides two outputs, it should be appreciated any number of outputs could be advantageously utilized in accordance with the invention. As will be further described below, the present invention is applicable to multiple output switched mode power converters.

More specifically, the exemplary power converter includes a transformer 20 having a single primary winding 22 and a pair of secondary windings 24, 26. One end of the primary winding 22 is connected to the input voltage source ($V_{IN}$) and the other end of the primary winding is connected to switch 48. The switch 48 is generally provided by a MOSFET device having a drain terminal electrically connected to the primary winding 22 and a source terminal electrically connected to ground through current sense resistor 78. A gate terminal of the switch 48 is driven by a suitable driver 46 that provides a series of pulse width modulated control pulses to turn the switch on and off at a controlled duty cycle. The first secondary winding 24 is connected in series with a rectifying diode 32 and output inductor 42 to provide the positive output voltage ($+V_{OUT}$). The second secondary winding 26 is connected in series with a rectifying diode 34 and output inductor 44 to provide the negative output voltage ($-V_{OUT}$). A common tap of the secondary windings 24, 26 provide an isolated ground. Smoothing capacitors 36, 38 are connected between the respective rectifying diodes 32, 34 and the isolated ground.

A control circuit 12 provides a control signal to the driver 46, which in turn regulates the output current delivered to the load by controlling the timing and duration of conduction of the switch 48. The control circuit 12 receives a combined feedback signal, reflecting the current through the primary winding 22 and the positive output voltage ($+V_{OUT}$). The control circuit 12 includes internal error amplifiers that compare the combined feedback signal to voltage references. The control circuit 12 includes an output pin (OUT) providing the control signal to the driver 46, a feedback pin (FB) providing a summing node for the combined feedback signal, a voltage reference pin ($V_{REF}$) providing a voltage reference output, an oscillator frequency control pin (RCT), a soft start pin (SS), and a power input ($V_{DD}$). The resistor 88 connected between the voltage reference pin ($V_{REF}$) and the oscillator frequency control pin (RCT) and capacitor 86 connected between the oscillator frequency control pin (RCT) and ground determines the frequency of the control signal. Capacitor 18 is connected to the soft start pin (SS). An internal current source connected to the soft start pin (SS) charges the capacitor 18 to a predetermined voltage (e.g., 2 volts). As long as the voltage across the capacitor 18 is below the predetermined voltage, the control signal to the driver 46 is inhibited and held low. When the voltage across the capacitor 18 reaches the predetermined voltage, the control circuit gradually ramps up the duty cycle of the control signal to the driver 46 so the output current delivered to the load increases in a controlled manner. In an exemplary embodiment, a Semtech SC4809A or comparable component may provide the control circuit 12.

The current sense resistor 78 is connected between ground and the primary winding 22, such that a voltage across the current sense resistor corresponds to the current passing through the primary winding. The current sense resistor is coupled to the feedback pin (FB) of the control circuit 12 through resistor 82. The positive output voltage ($+V_{OUT}$) is detected through a voltage sense circuit that includes opto-isolator 60 and shunt regulator 74. The opto-isolator 60 provides electrical isolation between the output and input sides of the power converter, and includes a light emitting diode (LED) 62 and a photo-transistor 64 disposed in the same package mounted next to each other. The LED 62 is coupled to the positive output voltage ($+V_{OUT}$) through resistor 66, and to the cathode terminal of the shunt regulator 74. Resistors 68 and 72 form a voltage divider circuit that provides a reference voltage to the shunt regulator 74 that corresponds to the positive output voltage ($+V_{OUT}$). Capacitor 76 provides phase compensation for the shunt regulator 74. The shunt regulator 74 will draw current through the LED 62 in correspondence with the positive output voltage ($+V_{OUT}$). Thus, any increase in the positive output voltage ($+V_{OUT}$) will result in a higher current flowing through the LED 62, thereby forcing the emitter voltage of the photo-transistor 64 to fall. The emitter terminal of the photo-transistor 64 is coupled to the feedback pin (FB) of the control circuit through resistor 84. A drop in the voltage at the feedback pin (FR) results in a reduction of the duty cycle of the control signal applied to the driver 46. This results in a negative feedback loop that has the tendency to keep the positive output voltage (+$V_{OUT}$) constant.

Figure 2:
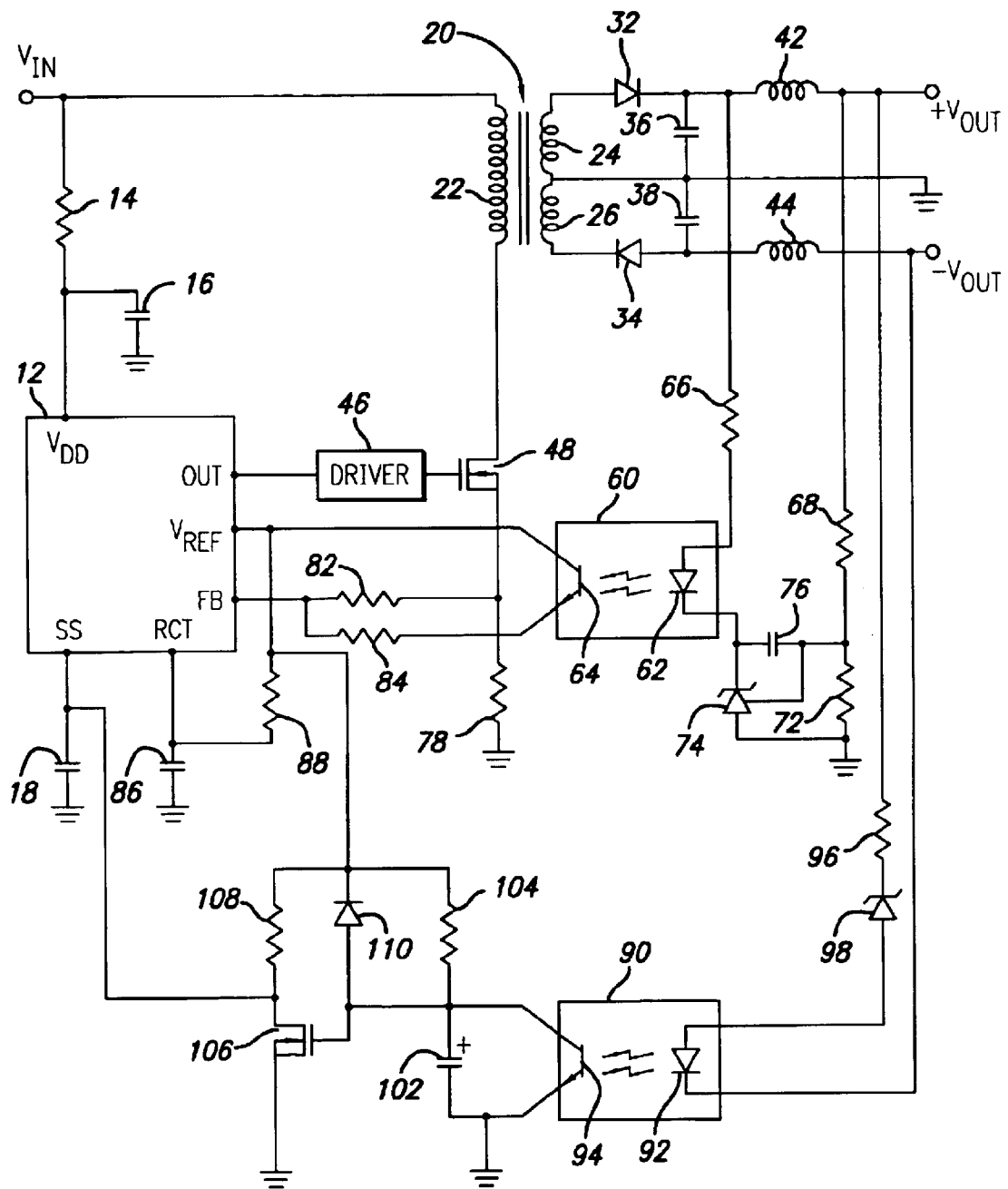
FIG. 2 is a schematic diagram of a dual output switching mode DC-to-DC power converter in accordance with an embodiment of the invention.

Referring now to FIG. 2, a dual output, switched mode DC-to-DC power converter is illustrated in accordance with an embodiment of the invention. The power converter of FIG. 2 includes a protection circuit that protects against an over-current or short circuit failure condition of the load. The protection circuit activates the soft-start circuit of the PWM control circuit upon detection of the over-current or short circuit condition. The soft-start circuit then shuts off operation of the power converter and restarts the power converter after a period of time defined by the soft-start circuit.

The protection circuit monitors the positive output voltage (+$V_{OUT}$) and the negative output voltage (−$V_{OUT}$) using a voltage sense circuit that includes opto-isolator 90, zener diode 98, and resistor 96. The opto-isolator 90 provides electrical isolation between the output and input sides of the power converter, and includes a light emitting diode (LED) 92 and a photo-transistor 94 disposed in the same package mounted next to each other. It should be appreciated that the opto-isolator 90 may further be combined in the same package with opto-isolator 60 described above. The anode of the LED 92 is coupled to the positive output voltage (+$V_{OUT}$) through zener diode 98 and resistor 96. The cathode of the LED 92 is coupled to the negative output voltage (−$V_{OUT}$).

The zener diode 98 is selected so that its voltage drop ($V_Z$) plus the voltage drop across the LED 92 ($V_D$) is less than the sum of the positive output voltage (+$V_{OUT}$) and the absolute value of the negative output voltage (−$V_{OUT}$). It should be appreciated that the voltage drop across resistor 96 is negligible due to the low current flowing through this portion of the protection circuit. As long as the voltage drop across the zener diode ($V_Z$) plus the voltage drop across the LED 92 ($V_L$) remains below the sum of the positive output voltage (+$V_{OUT}$) plus the absolute value of the negative output voltage (−$V_{OUT}$), the LED 92 will conduct current and emit light. But, when either the positive output voltage (+$V_{OUT}$) or the negative output voltage (−$V_{OUT}$) drops, i.e., pulls toward ground, such as due to a load over-current or short circuit condition, the voltage across the zener diode 98 drops below its working range and the zener diode stops conducting current. This causes the LED 92 to stop conducting current and emitting light. Thus, a load over-current or short circuit condition on either output is detected by the change in conduction of the opto-isolator 90.

The protection circuit further includes switch 106, resistors 104, 108, diode 110, and capacitor 102. The switch 106 may be provided by a MOSFET device. The capacitor 102 is connected between the collector and emitter terminals of the photo-transistor 94. The collector terminal of the photo-transistor 94 is further connected to the resistor 104, anode of diode 110, and gate terminal of switch 106. The source terminal of the switch 106 is connected to ground, and the drain terminal is connected to the soft-start pin (SS) of control circuit 12. The drain terminal of switch 106 is further connected to resistor 108, which is in turn commonly connected to the voltage reference pin ($V_{REF}$) along with diode 110 and resistor 104. It should be appreciated that the common point of resistors 104, 108 and diode 110 could be coupled to a voltage source other than the voltage reference pin ($V_{REF}$), such as another tap of the transformer 20.

The operation of the protection circuit is described as follows. During the initial start-up of the power converter, capacitor 102 is discharged and holds the gate terminal of switch 106 low. This maintains the switch 106 is an open or non-conductive state, thereby allowing the capacitor 18 connected to the soft-start pin (SS) to charge normally. Once the capacitor 18 charges to the desired voltage, the control circuit 12 provides the control signal to the driver 46, which in turn allows current to flow through the transformer 20 as discussed above. When the positive output voltage (+$V_{OUT}$) and the negative output voltage (−$V_{OUT}$) reach their operational voltage level, LED 92 of the opto-isolator 90 starts conducting current, causing the collector terminal of photo-transistor 94 to pull toward ground and thereby hold the gate terminal of the switch 106 low. The photo-transistor 94 thus takes over control of the switch 106 from the capacitor 102, and allows the power converter to continue functioning normally.

When a load-over current or short circuit condition occurs, current through the LED 92 is cut off as described above. This causes the collector terminal of photo-transistor 94 to pull high, allowing the capacitor 102 to be charged by the reference voltage ($V_{REF}$) through resistor 104 until the voltage on the gate terminal of switch 106 reaches its turn-on threshold. The switch 106 then changes to the conductive state, which causes the capacitor 18 to be discharged and initiate the soft-start circuit of the control circuit 12. This inhibits the control signal from being provided to the driver 46 and effectively shuts off delivery of current to the transformer 20. As long as the switch 106 continues to hold the soft-start pin (SS) to ground, capacitor 18 cannot recharge and the power converter remains in a shut-off condition. When the power converter is shut off, the voltage reference ($V_{REF}$) remains low and the capacitor 102 discharges through diode 110 and resistor 104 until the voltage on the gate terminal of switch 106 reaches its turn-off threshold. The resistor 104 and capacitor 102 may be selected having a sufficiently high RC constant that the capacitor 102 discharges relatively slowly. When the switch 106 turns off, the capacitor 18 begins to charge by operation of the soft-start circuit in the control circuit 12, thereby reinitiating the power converter. If the faulty load condition is removed, the power converter will return to normal operation. But, if the faulty load condition still exists, switch 106 will turn on again to disable operation of the power converter as discussed above.

Figure 3:
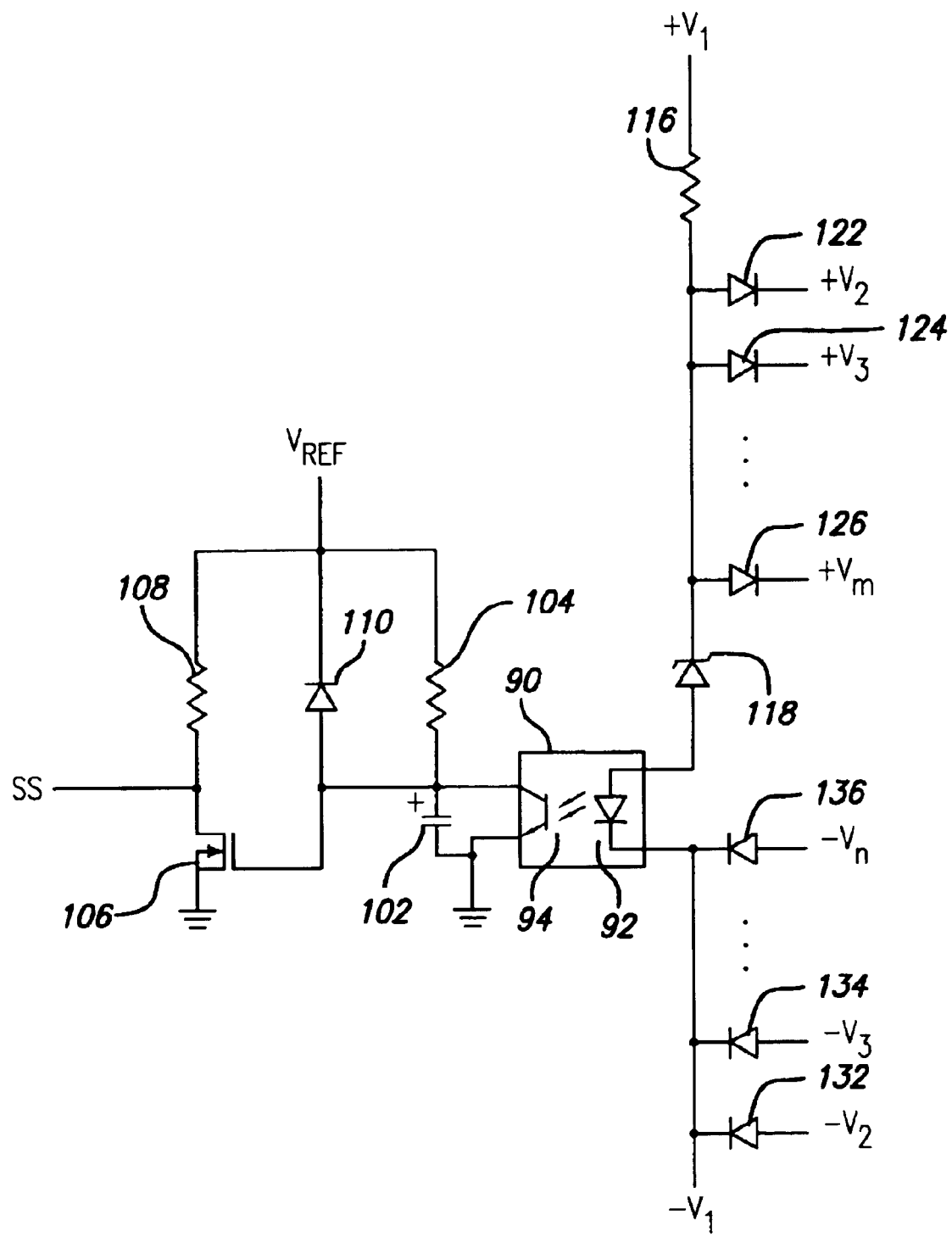
FIG. 3 is a schematic diagram of a portion of a multiple output switching mode converter in accordance with an embodiment of the invention.

FIG. 3 illustrates a portion of a switched mode DC-to-DC power converter having multiple outputs in accordance with an embodiment of the invention. The power converter of FIG. 3 includes positive outputs +$V_1$, +$V_2$, +$V_3$ . . . +$V_m$, and negative outputs −$V_1$, −$V_2$, −$V_3$ . . . −$V_n$. As in FIG. 2, a protection circuit protects against an over-current or short circuit failure condition of the load coupled to any one of the positive or negative outputs. The protection circuit activates the soft-start circuit of the PWM control circuit upon detection of the over-current or short circuit condition. The soft-start circuit then shuts off operation of the power converter and restarts the power converter after a period of time defined by the soft-start circuit.

The protection circuit monitors the positive and negative output voltages using a voltage sense circuit that includes opto-isolator 90, zener diode 118, and resistor 116. The opto-isolator 90 provides electrical isolation between the output and input sides of the power converter, and includes a light emitting diode (LED) 92 and a photo-transistor 94 disposed in the same package mounted next to each other (as described above). The anode of the LED 92 is coupled to the positive output voltage +$V_1$ through zener diode 118 and resistor 116, and to positive outputs +$V_2$, +$V_3$ . . . +$V_m$ through the zener diode and respective diodes 122, 124 . . . 126. The cathode of the LED 92 is coupled to the negative output voltage $-V_1$ and to outputs $-V_2, -V_3 \ldots -V_n$ through respective diodes 132, 134 . . . 136.

The zener diode 118 is selected to satisfy the following conditions:

$$+V_1 = \min\{+V_1, +V_2, +V_3 \ldots +V_m\} \quad (1)$$

$$|-V_1| = \min\{|-V_1|, |-V_2|, |-V_3| \ldots |-V_n|\} \quad (2)$$

$$\max\{+V_1, |-V_1|\} < V_Z + V_D < +V_1 + |-V_1| \quad (3)$$

wherein, $V_Z$ is the voltage drop across the zener diode 118 and $V_D$ is the voltage drop across the LED 92. As discussed above, the voltage drop across resistor 116 is negligible due to the low current flowing through this portion of the protection circuit, and can be ignored. As long as the voltage drop across the zener diode ($V_Z$) plus the voltage drop across the LED 92 ($V_L$) remains below the sum of the positive output voltage $+V_1$ plus the absolute value of the negative output voltage $-V_1$, the LED 92 will conduct current and emit light. But, when the voltage of any of the positive or negative outputs drops, i.e., pulls toward ground, such as due to a load over-current or short circuit condition, the voltage across the zener diode 118 drops below its working range and the zener diode stops conducting current. This causes the LED 92 to stop conducting current and emitting light. Thus, a load over-current or short circuit condition on either output is detected by the change in conduction of the opto-isolator 90 in the same manner as described above.

The protection circuit further includes switch 106, resistors 104, 108, diode 110, and capacitor 102 configured substantially as described above with respect to FIG. 2. The drain terminal of switch 106 is connected to the soft-start pin (SS) of control circuit 12. Resistors 104, 108 and diode 110 are commonly connected to the voltage reference pin ($V_{REF}$). It should be appreciated that the common point of resistors 104, 108 and diode 110 could be coupled to a voltage source other than the voltage reference pin ($V_{REF}$), such as another tap of the transformer 20.

Unlike conventional protection circuits that merely reduce the duty cycle of the power switch, the protection circuit of the present invention effectively increases the time between successive cycles of the power switch. This enables the current on the secondary side of the power converter to fully dissipate so that components (e.g., rectifiers) of the power converter are protected against overheating and failure. The present invention thereby provides protection against short duration or transient load over-current or short circuit conditions. The protection circuit is effective with any type of power converter topology (e.g., buck, boost, flyback, and forward converter), isolated or non-isolated, having dual or multiple outputs.

Having thus described a preferred embodiment of a method and apparatus for protecting a load of a dual output switching mode power converter against an over-current or short circuit failure condition, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A switching mode power converter, comprising:
   a transformer having a primary winding and a plurality of secondary windings, said plurality of secondary windings providing respective plural outputs through respective rectifiers;
   a switch connected in series with said primary winding;
   an input voltage source coupled to said primary winding;
   a controller adapted to control operation of said switch to control a flow of current through said primary winding, said controller including a feedback circuit to determine a duty cycle of said switch in response to a detected output voltage of at least one of said plural outputs and a detected current through said primary winding, said controller further including a soft-start circuit used to inhibit activation of said switch for a predetermined period of time; and
   an over-current protection circuit coupled to said plural outputs so as to detect a change in a voltage of any one of said plural outputs due to a load over-current or short circuit condition, wherein upon detection of said voltage change, said over-current protection circuit activates said soft-start circuit to shut off delivery of said flow of current through said primary winding for said predetermined period of time.

2. The switching mode power converter of claim 1, wherein said plural outputs further comprise at least a positive output and a negative output.

3. The switching mode power converter of claim 1, wherein said soft-start circuit further comprises a capacitor coupled to an internal current source of said controller, said period of time being defined by a charge time of said capacitor.

4. The switching mode power converter of claim 3, wherein said over-current protection circuit discharges said capacitor upon detection of said voltage change.

5. The switching mode power converter of claim 3, wherein said over-current protection circuit further comprises a switch coupled to said capacitor, said switch connecting said capacitor to ground upon detection of said voltage change.

6. The switching mode power converter of claim 1, wherein said change in voltage further comprises a drop in voltage relative to ground.

7. The switching mode power converter of claim 1, wherein said over-current protection circuit further comprises an opto-isolator providing electrical isolation between said plural outputs and said controller.

8. The switching mode power converter of claim 1, wherein said over-current protection circuit maintains said soft-start circuit in an activated state for a second predetermined period of time, said power converter restarting by operation of said soft-start circuit after completion of said second predetermined period of time.

9. In a switching mode power converter comprising plural outputs and a controller adapted to control a flow of current to said plural outputs, said controller including a soft-start circuit used to inhibit said flow of current during start-up of said power converter, a method for protecting said power converter from an over-current or short circuit condition comprises the steps of:
   detecting a change in voltage of any one of said plural outputs;
   activating said soft-start circuit upon detection of said voltage change; and
   after a predetermined period of time, resuming normal operation of said power converter.

10. The method of claim 9, wherein said soft-start circuit further comprises a capacitor coupled to an internal current source of said controller, said activating step further comprising discharging said capacitor.

11. The method of claim 10, further comprising isolating said plural outputs from said controller.

12. The method of claim 9, further comprising maintaining said soft-start circuit in an activated state for a second predetermined period of time, wherein said resuming step occurring after completion of said second predetermined period of time.

13. A switching mode power converter, comprising:

an inductor coupled to a rectification stage having a plurality of outputs;

a switch connected in series with said inductor;

an input voltage source coupled to said inductor;

a controller adapted to control operation of said switch to control a flow of current through said inductor, said controller including a feedback circuit to determine a duty cycle of said switch in response to a detected voltage of at least one of said plurality of outputs and a detected current through said inductor, said controller further including a soft-start circuit used to inhibit activation of said switch for a predetermined period of time; and an over-current protection circuit coupled to said plurality of outputs so as to detect a change in a voltage of any one of said outputs due to a load over-current or short circuit condition, wherein upon detection of said voltage change, said over-current protection circuit activates said soft-start circuit to shut off delivery of said flow of current through said inductor for said predetermined period of time.

14. The switching mode power converter of claim 13, wherein said plurality of outputs further comprise at least a positive output and a negative output.

15. The switching mode power converter of claim 13, wherein said soft-start circuit further comprises a capacitor coupled to an internal current source of said controller, said period of time being defined by a charge time of said capacitor.

16. The switching mode power converter of claim 13, wherein said voltage change further comprises a drop in voltage relative to ground.

17. The switching mode power converter of claim 15, wherein said over-current protection circuit discharges said capacitor upon detection of said voltage change.

18. The switching mode power converter of claim 15, wherein said over-current protection circuit further comprises a switch coupled to said capacitor, said switch connecting said capacitor to ground upon detection of said voltage change.

19. The switching mode power converter of claim 13, wherein said over-current protection circuit further comprises an opto-isolator providing electrical isolation between said plurality of outputs and said controller.

20. The switching mode power converter of claim 13, wherein said converter further comprises at least one of a buck converter, a boost converter, a flyback converter, and a forward converter.

* * * * *